United States Patent [19]

Casanueva et al.

[11] Patent Number: 5,634,651
[45] Date of Patent: Jun. 3, 1997

[54] LAND TRANSPORTATION DEVICE

[75] Inventors: Manual Casanueva, Viña del Mar; Elias Cancino, Valparaiso; Ariel Nuñez, Raneagua, all of Chile

[73] Assignee: Universidad Catolica de Valparaiso, Valparaiso, Chile

[21] Appl. No.: 569,783

[22] Filed: Dec. 8, 1995

[30] Foreign Application Priority Data

Dec. 9, 1994 [CL] Chile ........................... 1845-94

[51] Int. Cl.⁶ ........................................... A63G 25/00
[52] U.S. Cl. ................................. 280/208; 280/1.181
[58] Field of Search ............................ 114/270; 441/78; 280/208, 1; 472/20, 32, 34

[56] References Cited

U.S. PATENT DOCUMENTS

| | | | |
|---|---|---|---|
| 520,899 | 6/1894 | Ronk | 441/78 |
| 2,909,145 | 10/1959 | De Hertelendy | 280/208 |
| 3,718,342 | 2/1973 | Freed | 280/208 |
| 4,579,336 | 4/1986 | Morin | 441/78 |
| 5,183,386 | 2/1993 | Feldman | 416/119 |

FOREIGN PATENT DOCUMENTS

| | | |
|---|---|---|
| 1293749 | 12/1991 | Canada . |
| WO87/02099 | 4/1987 | European Pat. Off. . |
| 2428447 | 1/1980 | France . |
| 237298C | 5/1910 | Germany . |
| 2300403 | 7/1974 | Germany . |
| 2604132 | 8/1977 | Germany . |
| 2619951 | 11/1977 | Germany . |
| 2244009 | 11/1991 | United Kingdom . |

*Primary Examiner*—Jesus D. Sotelo
*Attorney, Agent, or Firm*—Knobbe, Martens, Olson & Bear, LLP

[57] ABSTRACT

A land transportation device for compact, sandy and open land, with or without a slope, based on the intersection of two reinforced and identical truncated rings in orthogonal planes with respect to each other. The geometric centers shifted of the rings are shifted over the line of intersection of these planes. The weight of the device is reduced since it is made up of two light truncated rings, while at the same time, the cabin space is increased. The rings present a soft friction surface which gives the device better adherence to the ground, reducing the vibrations and facilitating the movement of the device. The device also possesses a hinge system which makes it possible to fold the ring on two axes, parallel to each other, thereby reducing its size. The disassembled device can be placed in a rectangular box for transportation and storage.

23 Claims, 6 Drawing Sheets

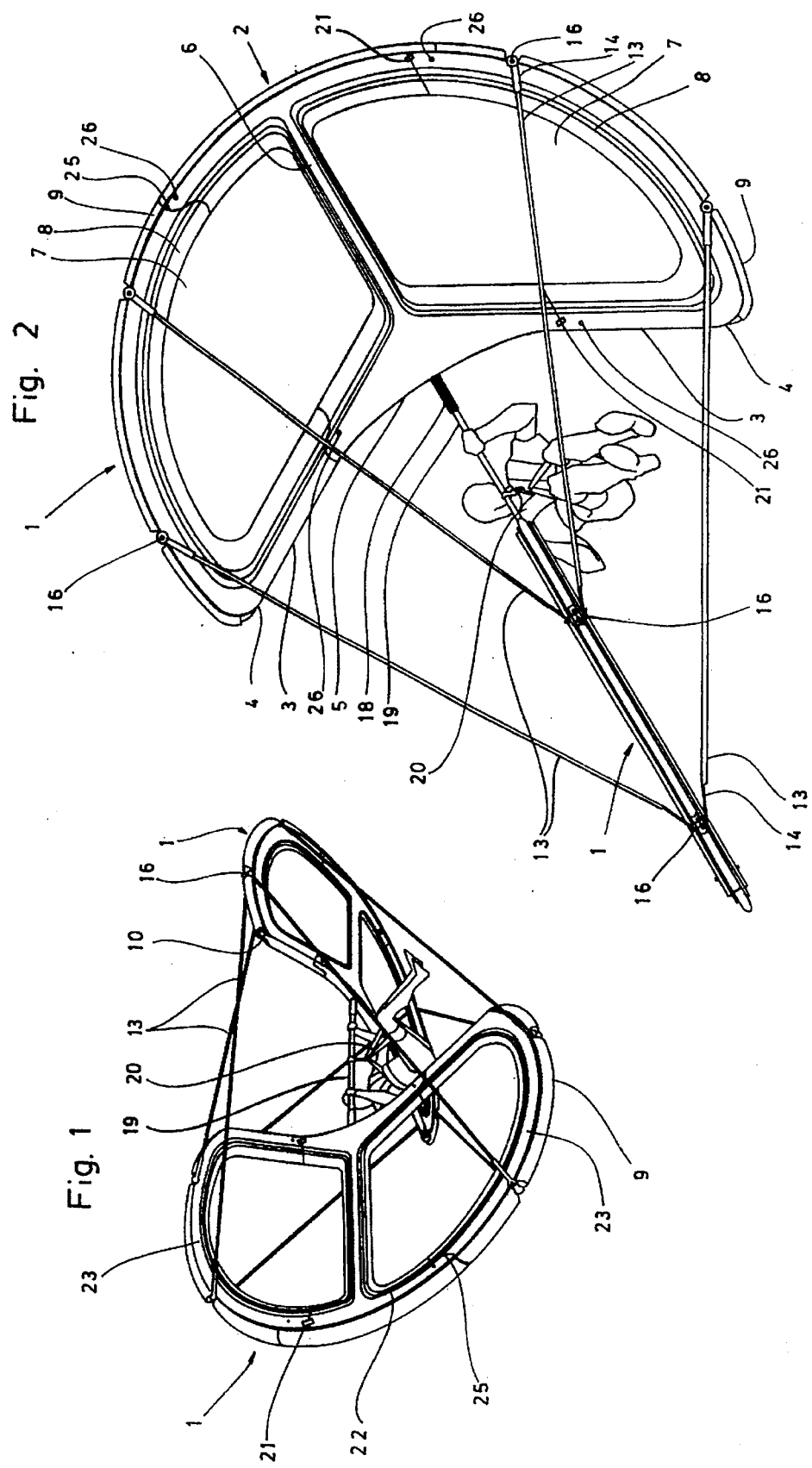

LAND TRANSPORTATION DEVICE

BACKGROUND OF THE INVENTION

1. Field of the Invention

The invention relates to an improved version of a land transportation device for compact, sandy and open land, with or without a slope.

2. Description of the Prior Art

Spherical land transportation devices for open compact sandy soils with or without a slope, where there are winds and slopes, in the field of adventure and recreational sport, present certain usage and transportation disadvantages.

One of the most frequently used land transportation shapes for adventure and recreational sport, among spherical devices, consists of the Olympic wheel, made up of a conventional cylindrical wheel, which requires great effort for use, inasmuch as it is a gymnastic device.

On the other hand, Salvador Dalí's pedal sphere has the disadvantage of not being steerable or capable of being disassembled and presents difficulties in horizontal instability.

The invention of the land transportation device according to Chilean Patent Application No. 421-93, based on the merger of a wheel and propeller, presents the disadvantage that its rigid friction surface can produce vibrations, it has a compact cabin and, because of the weight of its structure, in addition to being partially capable of being disassembled, it is difficult to ship.

SUMMARY OF THE INVENTION

The present invention offers an improved version of a land transportation device for sandy and open lands with or without a slope, based on the intersection of two identical and reinforced truncated rings. The rings make up orthogonal planes with each other with their geometric centers shifted over the line of intersection of these planes. The improvement in the structure makes it possible to resolve the disadvantages of the previous invention in several ways: the weight of the device is reduced because it is made up of two light truncated rings, while at the same time the cabin space is increased, the rings present a soft friction surface which gives the device better adherence to the ground, reducing the vibrations and facilitating the movement of the device; the device also possesses a hinge system which makes it possible to bend the rings on two axes parallel to each other, thereby reducing the size and enabling storing of the disassembled device in a rectangular box for its transportation.

For a better explanation of the invention, a preferred embodiment is described below in relation to the accompanying figures.

BRIEF DESCRIPTION OF THE DRAWINGS

FIG. 1 is a perspective view of the device in use;

FIG. 2 is a front elevated view of the device in use;

DESCRIPTION OF THE PREFERRED EMBODIMENTS

Figure 4:
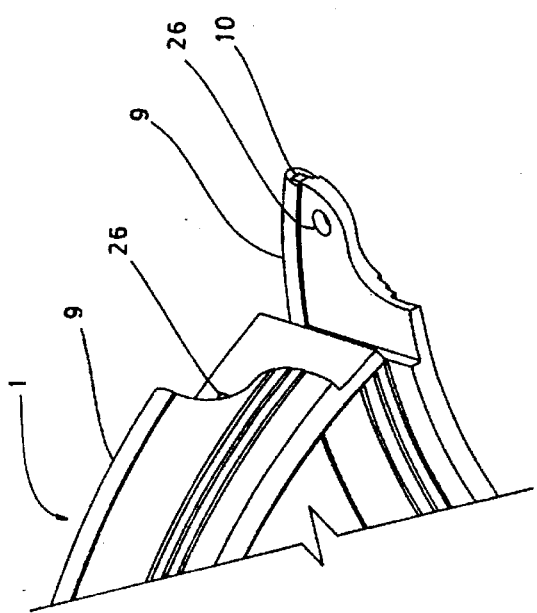
FIG. 4 is a perspective view of the hinge mechanism with the ring partially folded.

With reference to the attached figures, the invention consists of an improved version of a land transportation device consisting of two identical and reinforced truncated rings 1, which make up orthogonal planes with each other, with their geometrical centers shifted over the intersection line 2 of these planes.

As seen in FIGS. 1 and 2, each ring 1 possesses a circular sector which disappears over one-third of its circumference, with the two remaining thirds of the arc being connected through two radial bars 3. The bars 3 clamp to the curvature of the ring 1 by means of their rounded ends 4 and are joined together on the intersection line 2, at a slightly curved central vertex 5, slightly shifted from the geometric center of the ring 1 toward its curvature. A central linear reinforcement 6 extends from the vertex 5. The reinforcement 6 has rounded ends that clamp to the curvature of the ring 1 and to the radial bars 3, dividing the truncated ring 1 into two open sections 7, symmetric with respect to the axis that runs along the intersection line 2.

Figure 5:
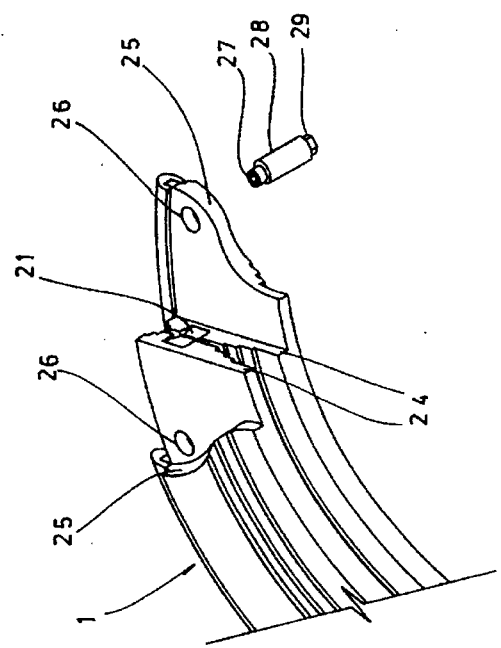
FIG. 5 is a perspective view of the hinge mechanism with the ring entirely folded, showing also the Allen bolt for fastening both sections of the ring to ensure the assembly of the device.

Both openings 7 are reinforced around the perimeter, both on the front and rear face, by an edge 8 of expanded polyurethane comprising three successive levels decreasing toward each opening 7. With reference to FIGS. 4 and 5, the external profile of the curvature of the ring 1 has a slightly projecting convex rubber protection 9 adhered to a central projection 10 over the thickness of the curve. The central projection 10 barely projects outward at the ends of the rubber 9 over the rounded ends 4 of the radial bars 3.

Figure 8:
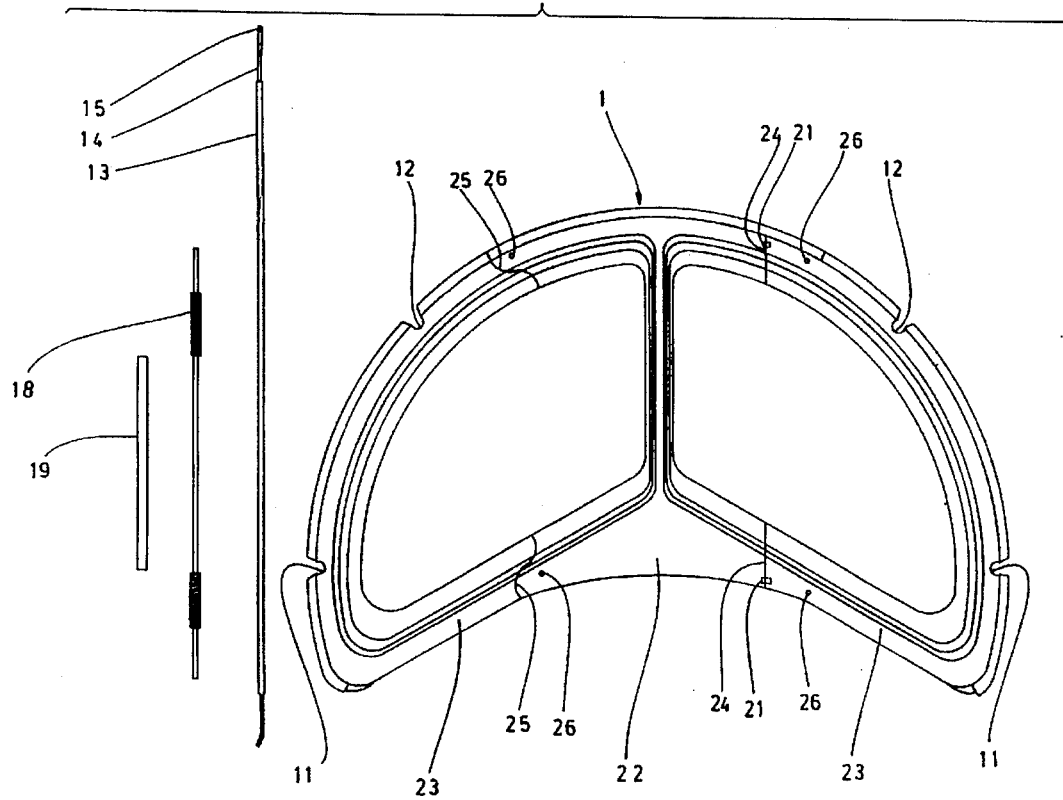
FIG. 8 is an upper plan view of the disassembled device.

As best seen in FIG. 8, proximate the rounded ends 4 and toward the curvature of the ring 1 on the axis of its diameter perpendicular to the central reinforcement 6, there are located two small holes 11 that pierce the front and rear walls reducing the central projection 10 and the rubber 9. Two other small holes 12 likewise pierce the walls of the ring 1 on the virtual prolongation of the radial bars 3 in the curvature of the ring 1, reducing the central projection 10 and the rubber 9. The two small holes 12 are spaced the same distance between the central reinforcement 6 and the other two small holes 11. To these four small holes are connected the tension tubes 13 that give the device its structure.

Figure 6:
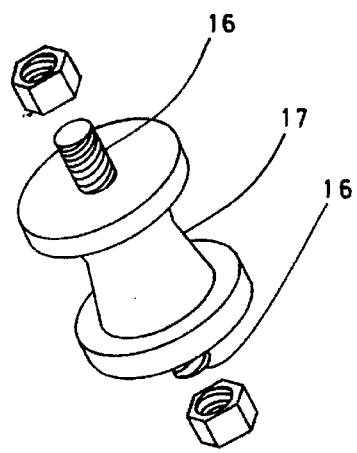
FIG. 6 is a perspective view of the connection part of the tension rods with the two separate nuts of the rebushed bolts.
Figure 7:
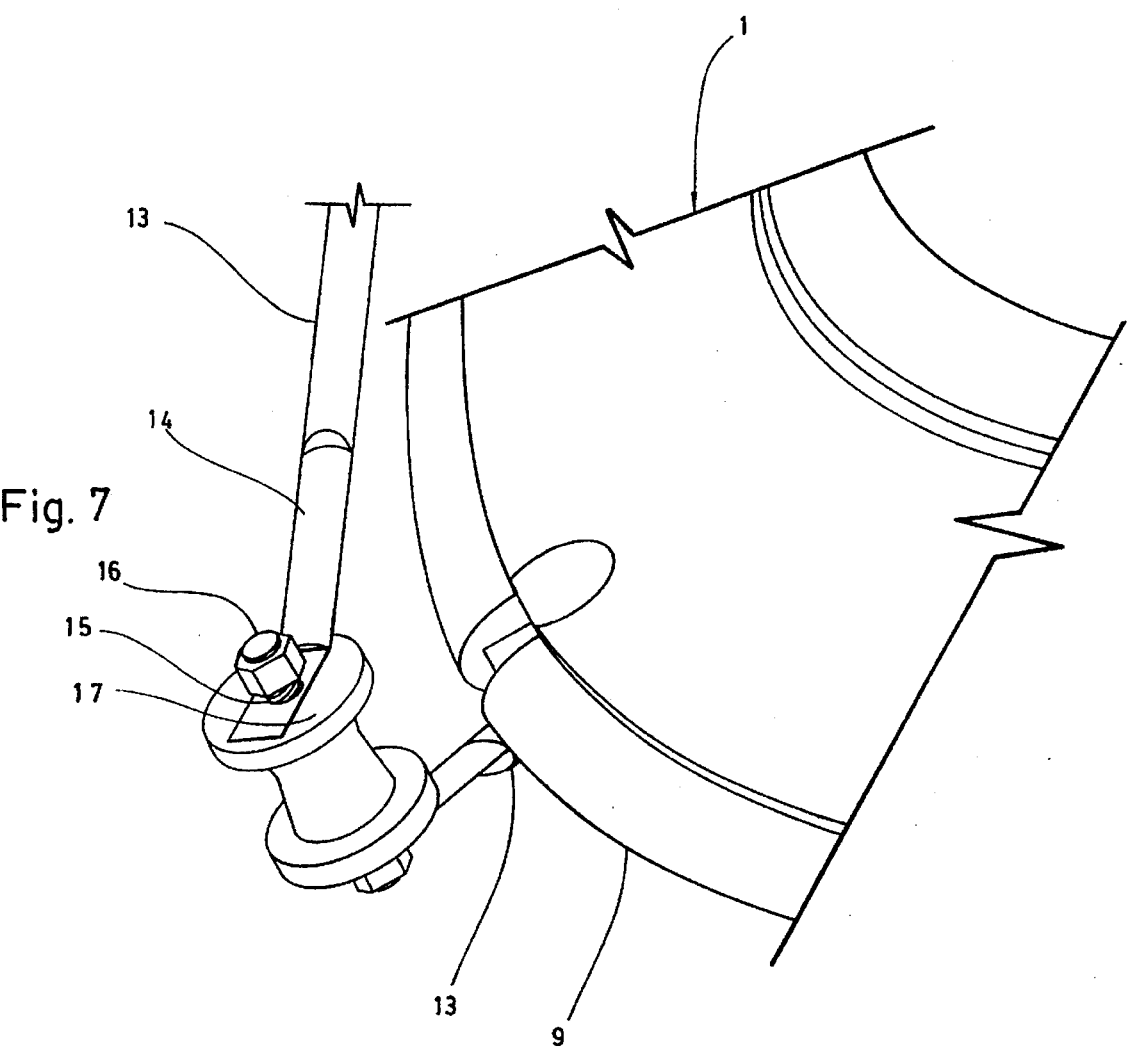
FIG. 7 is a perspective view of the tension rods joined to the rebushed bolts very close to the fastening hole in the ring.

The eight tension tubes 13 consist each of a filled or hollow elongated tube filled with expanded polyurethane. As shown in FIG. 7, the ends of the tubes 13 are flattened, as at 14, perpendicular to one another. The flattened ends connect to a small inclined terminal portion which has a central perforation 15. The four tension tubes 13 have their inclined terminal portions oriented toward one side, symmetrically opposed to one of the inclined terminal portions of the other four tension tubes 13. Each pair of tension tubes 13 with opposite symmetrically inclined terminal portions are joined to a connector made up of two rebushed bolts 16 and a rubber support 17 of two truncated conical sections joined at their smaller bases, as seen in FIGS. 6 and 7. The larger bases of the rubber supports 17 are joined each to an annular projection from the center of which the two opposed bolts 16 project. The bolts 16 extend through the central perforation 15 of the tension tubes 13 and are secured with nuts.

Figure 3:
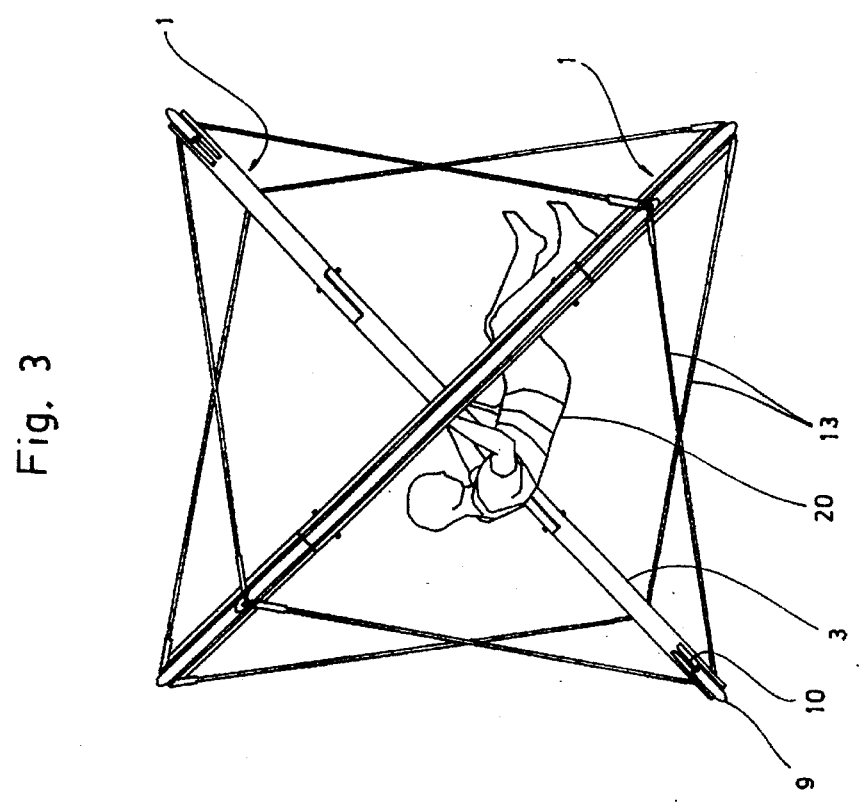
FIG. 3 is a side elevated view of the device in use.

As seen in FIGS. 1–3, the connectors are positioned in the small holes 11 and 12 in such a way that all the pairs of tubes 13 are directed from one hole 12 over the virtual projection of the radial bars 3 toward a hole 11 on the axis of the diameter perpendicular to the central reinforcement 6 of the opposite ring 1. The device is assembled so that the tension tubes 13 are joined together, forming vertices that comprise a sharp angle and keep the rings 1 rigid, thereby structurally closing the device. When the device is assembled, both rings 1 oriented orthogonally present radial bars 3 near the center of the opposite ring 1. Both central vertices 5 are separated approximately by the radius of the ring 1, generating a central space or driver's cabin. In the central space, both rings 1 are connected with a fastening bar with two springs 18 at its ends located on the intersection line 2. The ends of the fastening bar are fastened to the central vertex 5 of each ring 1. The central area of the vertex 5 coincides with the geometric axis of intersection of both rings 1. A tube 19 of a shorter length and larger diameter than the fastening bar is joined together with the fastening bar by bearings, making it possible for one bar to spin freely over another. A harness 20 for holding the driver is fastened to the tube 19. The harness 20 is made up of one support for the torso and another for the pelvis, independent of each another, but joinable by means of chest and waist clips. The harness 20 also has an independent support for the knees which can be detached at the driver's discretion.

Parallel to the central reinforcement 6, four hinges 21 are located, distributed in pairs on opposite sides of the reinforcement 6. Each pair of hinges 21 consists of one on the curvature of the ring 1 and the other over the radial bar 3. One pair of hinges 21 is placed toward the front face of the ring 1 and the other toward the rear face. As seen in FIG. 1, the hinges 21 divide the ring 1 into one central section 22 and two end sections 23.

Figure 9:
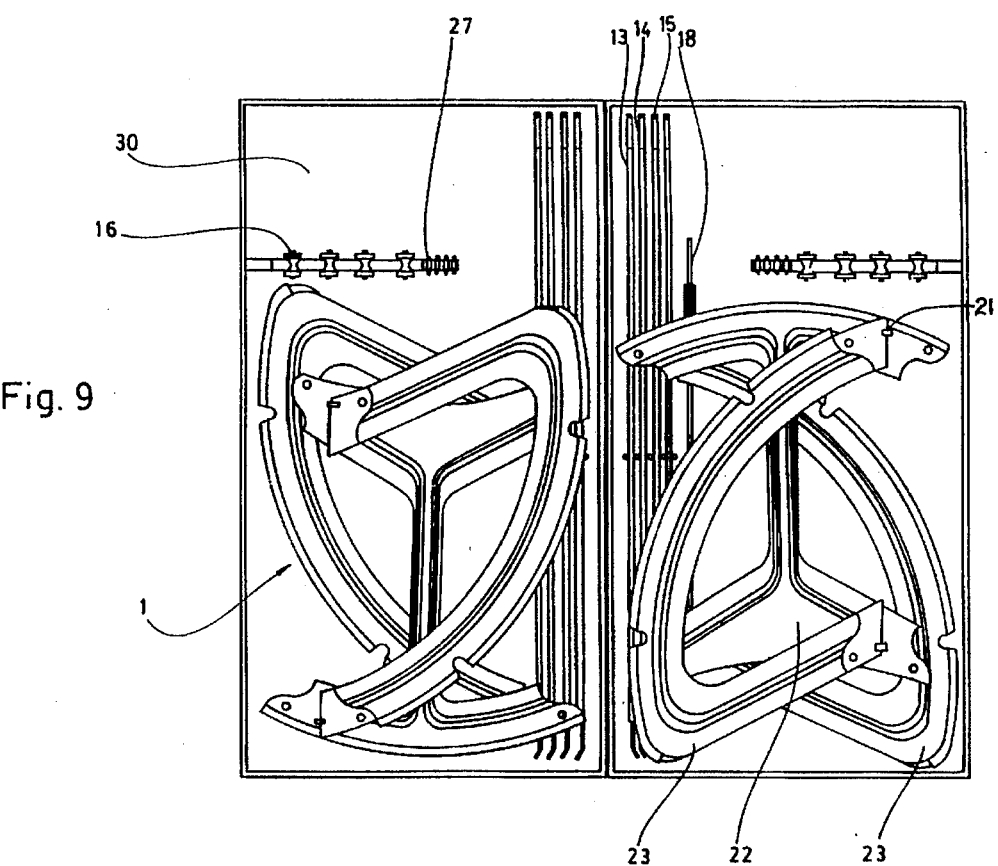
FIG. 9 is an upper plan view of the disassembled and folded device in a stored position in the box.

As best seen in FIGS. 4, 5 and 8, a coupling system between the sections 22 and 23 is made up of a straight connecting line 24 parallel to the central reinforcement 6, crossing over each hinge 21, perpendicularly cutting the entire width of the curvature of the ring 1 and of the radial bar 3 until it reaches half of its thickness. The coupling system continues in a cut parallel to the front and rear walls, and transitions into a new cut perpendicular to the walls of the ring 1 generating a curved and countercurved connecting line 25 where the rubber is cut 9. The connecting line 25 appears through the wall of the ring 1 opposite the hinge 21 at a short distance from the hinge and toward the round ends 4 of the ring 1. The coupling system makes it possible to collapse and fold up the ring 1 in such a way that the central reinforcement 6 in a closed position is located between the other two end sections 23. A small hole 26 is located between the hinge 21 and the curved and countercurved joint line 25. The hole 26 extends through the walls of both the central 22 and the end 23 sections. An injected Allen bolt 27 within a cylindrical rubber support 28 is inserted through the small hole 26 and expands when the nut 29 is tightened from the other end, securing the coupling system between central 22 and the end 23 sections when assembling the device. The disassembled and folded device is received by a rectangular box 30 prepared to hold its parts in an orderly fashion, as shown in FIG. 9.

Figure 10:
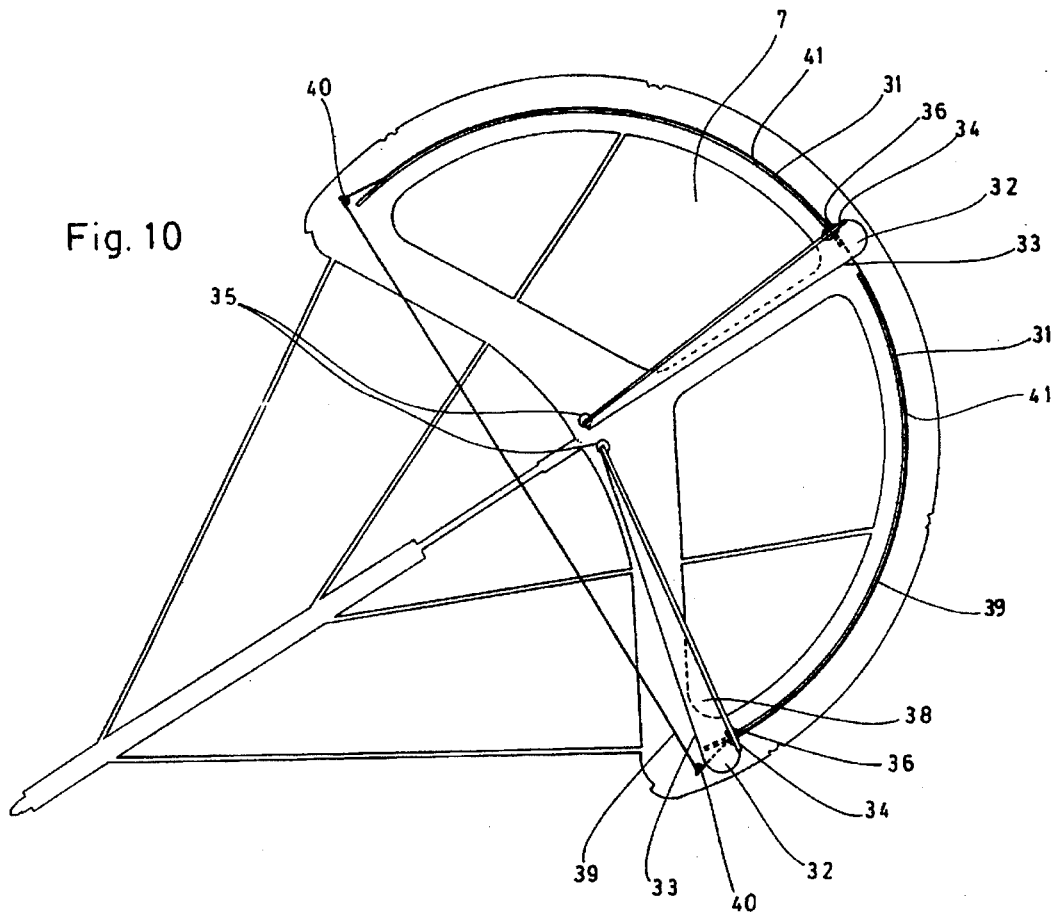
FIG. 10 is a rear elevated view of the device with its sail mechanism in a completely furled position.
Figure 11:
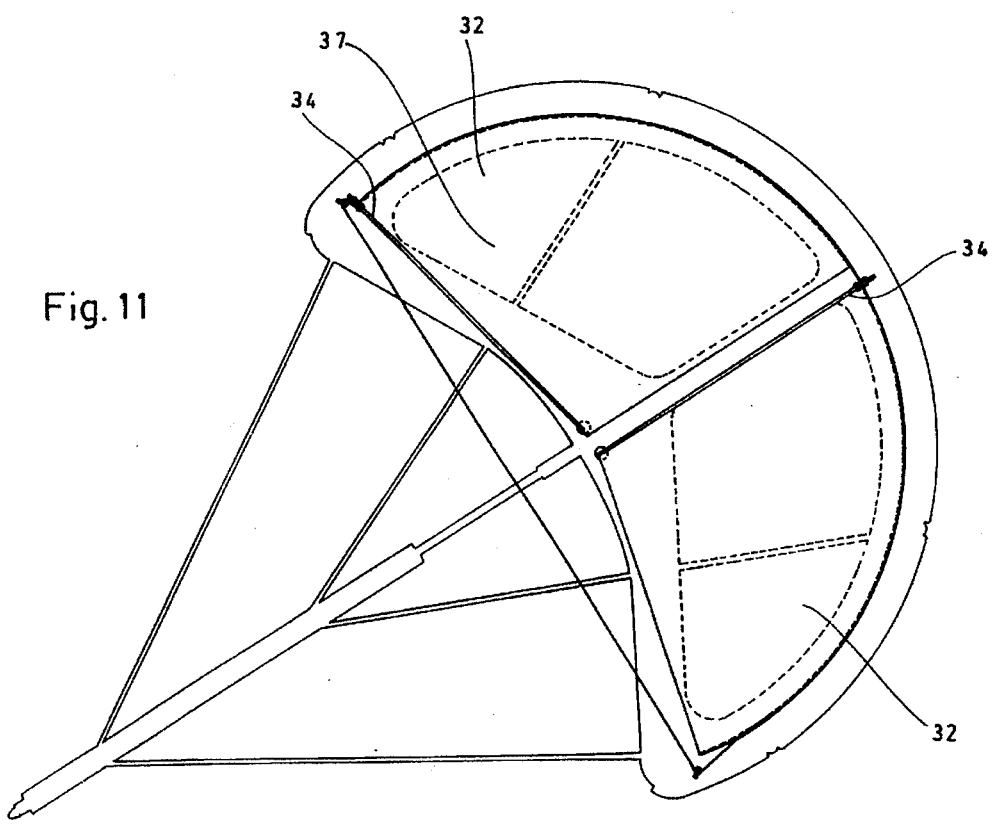
FIG. 11 is a rear elevated view of the device with its sail mechanism in a completely unfurled position.

On one face of each ring 1 and near the inside edge of its curvature, two guide rails 31 of the cell membranes 32 are located, as seen in FIG. 10. The guide rails 31 are slightly separated from each another at the central axis of the ring 1, and they extend until they reach the radial bars 3. The guide rails 31 make it possible to furl and unfurl the sail 32 in each hollow section 7 of the ring 1. The sail 32 is fastened to an arrival line 33 on the central reinforcement 6 for one membrane and on the radial bar 3 for the other membrane. Each membrane is fastened to a support rod 34 connected to a pivoting sheave 35, very close to the geometric center of the ring 1, and to sheaves 36 which run along the rail 31. The hollow section 7 is entirely covered with each membrane extended in an unfurled position 37. Both membranes may be entirely gathered in a furled position 38, in addition to the intermediate combinations such as half furled and others.

The furling operation is performed at the driver's discretion by means of a tensed cable 39 for furling and unfurling the sails 32. Each tensed cable 39 crosses the cabin near the central vertex 5, attaches to the rods 34, and connects to two pulleys 40, located very close to the rounded ends 4 of the ring 1. The membranes of the sails 32 are furled when pulling the cable 39 in a direction from the pulley 40 closest to the arrival line 33 toward the other pulley 40. The membranes of the sails 32 are unfurled by pulling the cable in the opposite direction, i.e., from the pulley 40 farthest from the arrival line 33 toward the other pulley 40. Each rail includes a cut 41 on the folding axes of the central 22 and the end 23 sections, which makes it possible to keep the sail system 32 assembled, even in a stored or closed position by only removing the cable 39 and guiding the rods 34 toward the central reinforcement 6 so that they are located between the axes of the hinges 21 in the central section 22 of the ring 1.

Figure 12:
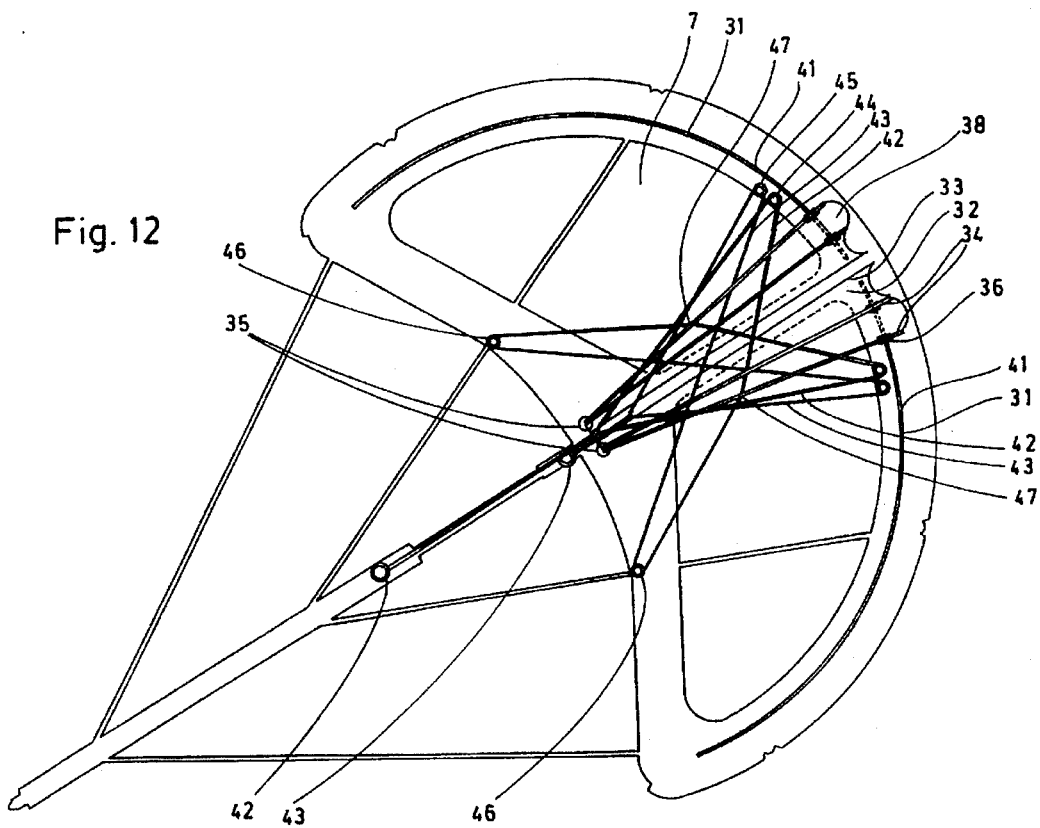
FIG. 12 is a rear elevated view of the device considering an alternative of the sail mechanism, in a completely furled position.
Figure 13:
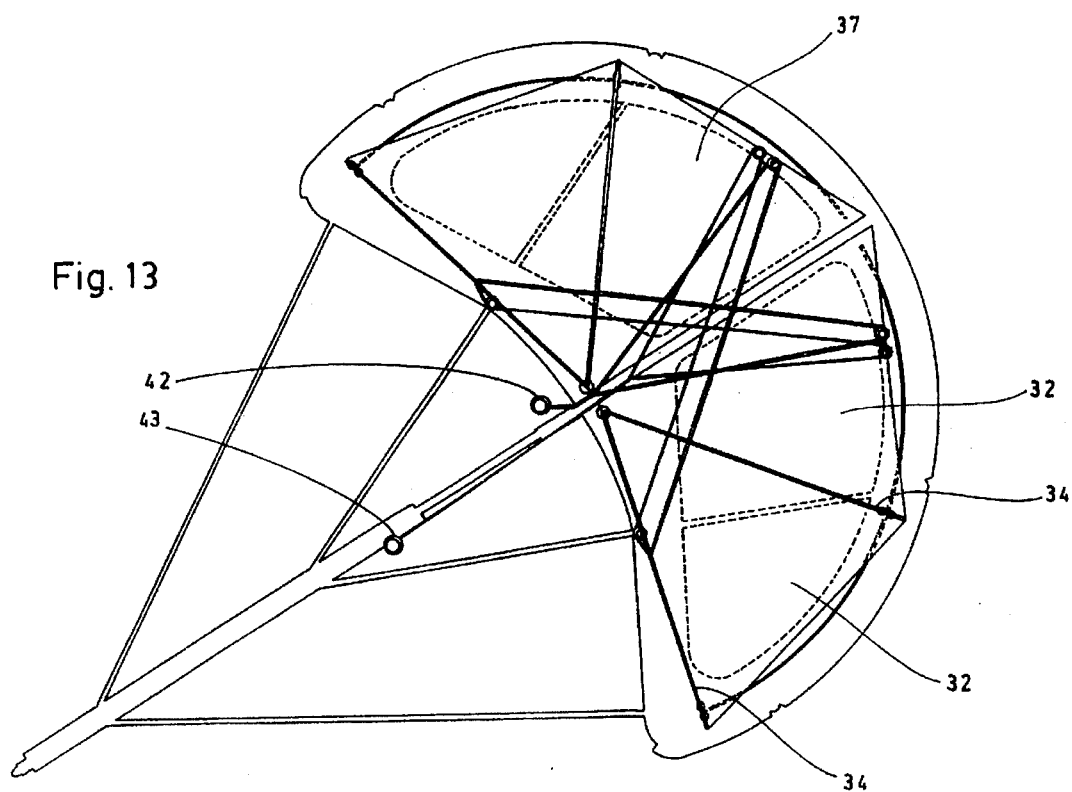
FIG. 13 is a rear elevated view of the device considering an alternative of the sail mechanism, according to FIG. 12, in a completely unfurled position.

Despite the fact that the preceding mechanism describes and illustrates a reference embodiment of the furling and unfurling mechanism of the sails 32, other constructive forms are possible. In an alternative embodiment of the mechanism for furling and unfurling the sails 32, see in FIGS. 12 and 13, on one side of each ring 1 and near the inside edge of its curvature, two guide rails 31 of the four membranes of the sails 32 are located, slightly separated from each other by the central axis of the ring 1. The guide rails 31 extend until they reach the radial bars 3, making it possible to furl and unfurl, in each hollow section 7 of the ring 1, the sails 32. Each sail 32 is fastened to an arrival line 33, on the central reinforcement 6, and to two support rods 34, dividing the membranes of the sails 32 on each hollow section 7 of the ring 1. The support rods 34 are connected to a pivoting sheave 35, very close to the geometrical center of the ring 1, and to sheaves 36 which run along the rail 31. Each hollow section 7 is entirely covered with each membrane extended in an unfurled position 37. The membranes may also be entirely gathered in a furled position 38, in addition to the intermediate combinations, such as half furled and others.

The furling operation is performed at the driver's discretion through a cable with a furling handle 42 and a cable, and with an unfurling handle 43 and cable. The handles 42 and 43 are located in the geometric center of the ring 1 and are connected by the cable to furling 44 and unfurling 45 pulleys, respectively, located in the internal profile of the curvature of the ring 1 very close to the rail 31 and near the joint lines 24 of the central section 22. The cables are distributed to a furling pulley 44 next to an unfurling pulley 45 in each hollow section 7. Each furling cable 42 is directed toward the support rod 34 farthest from the central reinforcement 6 on the opposite hollow section 7, while each furling cable 43 is directed to a pulley 46 in the opposite hollow section 7, located on the outside edge of the radial bars 3, at the point where it clamps the curvature of the central vertex 5, and which is in the same axis of the pulley 45 parallel to the central reinforcement 6. The unfurling cable 43 is then directed until it reaches the closest support rod 34, with both cables 42 and 43 approximately at the half-way point of the aforesaid support rod 34, at a furling-unfurling traction point 47. The furling system 38 operates by pulling the handle of the furling cable 42 and by traction, the handle of the unfurling cable 43 is gathered, with the sail membranes 32 being gathered and vice versa. When the sail system 32 is in a furled position 38, it does not exceed the joint lines 24 and 25 of each central section 22, which, joined to a cut 41 in each rail, on the folding axes of the central 22 and the end 23 sections, makes it possible to keep the sail system 32 entirely fitted to the rings 1, even in a stored or closed position.

Although this invention has been described in terms of certain preferred embodiments, other embodiments that are apparent to those of ordinary skill in the art are also within the scope of this invention. Accordingly, the scope of the invention is intended to be defined by the claims that follow.

We claim:

1. A land transportation device comprising:

two reinforced and identical truncated rings, the rings being coupled together and defining orthogonal planes and a line of intersection between said planes, said rings positioned so that their geometric centers are shifted along said intersection line; and sails arranged on each ring, wherein said device moves along a surface utilizing gravitational and wind forces.

2. The device of claim 1, wherein each ring comprises:

an arcuate portion defining approximately two-thirds of a circle;

two radial bars extending from the terminal ends of said arcuate portion generally toward the center of the ring and joined together at a rounded central vertex; and a linear central reinforcement extending from said central vertex to said arcuate portion for structural strength and rigidity.

3. The device of claim 2, wherein the linear central reinforcement is located on said intersection line between said planes, and divides each ring into two hollow sections symmetrical to one another and defining two cavities.

4. The device of claim 3, wherein said symmetrical hollow sections are reinforced on the perimeter, both on first and second opposed faces, by a stepped cross-section having decreasing thickness toward each cavity.

5. The device of claim 3, further including:

a plurality of resilient tension tubes extending between and connecting said truncated rings for strength, said tension tubes attached at four connection points on the arcuate portion of each truncated ring, a first pair of said connection points located along virtual projections of said radial bars, and a second pair of said connection points located along a diametric line of said rings perpendicular to said central reinforcement.

6. The device of claim 5, wherein said connection points comprise small holes formed in the circumference of said arcuate portion, said tension tubes extending from the arcuate portion of one truncated ring to the arcuate portion of the other, wherein tension tubes extend between said first pair of connection points on one truncated ring to said second pair of connection points on the other truncated ring, and tension tubes extend between said second pair of connection points on the first truncated ring to said first pair of connection points on the other truncated ring.

7. The device of claim 5, wherein there are eight of said tension tubes, one of said eight tubes extending between each coupled pair of connection points.

8. The device of claim 5, wherein said tension tubes comprise hollow elongated tubes filled with expanded polyurethane, and wherein opposite ends of said tubes are flattened in planes perpendicular to one another, said tubes including small terminal portions adjacent said flattened portions and inclined out of the plane of said flattened portions, said terminal portions including apertures, said connection points comprising small holes formed in the circumference of said arcuate portion, and said device including a plurality of connectors configured to insert in said small holes and adapted to attach to said apertures in said terminal portions of said tension tubes.

9. The device of claim 8, wherein said tension tube connector comprises:

a pair of injected bolts within a rubber support, said support having two truncated conical sections joined at their smaller bases, said support having annular projections from the larger bases of said conical sections, and wherein said injected bolts project from the center of each annular projection in opposite directions, said terminal portion apertures of said tension tubes being sized to fit over said extending bolts, said connector further including nuts coupled to said bolts and attaching said tension tubes to said rubber support.

10. The device of claim 3, further including a retractable sail structure on each of said truncated rings, comprising:

two arcuate guide rails provided on said arcuate portion, and associated with said hollow sections, said guide rails extending approximately from said radial bars around said arcuate portion and spaced apart at said central reinforcement;

each hollow section provided with a support rod pivoted about a sheath proximate to the geometric center of the ring, said support rod extending generally radially outward and having a second sheath attached thereto adapted to run along said guide rail; and a sail membrane for each hollow section fastened to said support rod and having a first position in which said sail structure is furled, and a second position in which said sail structure is unfurled and said sail membrane entirely covers each hollow section of said ring.

11. The device of claim 10, wherein said sail structure further includes a furling/unfurling cable fastened to outer ends of both of said support rods, said furling/unfurling cable guided around said guide rails and directed around two pulleys located proximate the intersection of said arcuate portion and said radial bars, said furling/unfurling cable extending between said pulleys, wherein one of said support rods in said first position lies approximately along said radial bar, and wherein the other of said support rods in said first position lies approximately along said central reinforcement, and wherein said one of said support rods in said second position lies approximately along said central reinforcement, and wherein said other of said support rods in said second position lies approximately along one of said radial bars, the movement of both support rods being slaved to movement of said cable, the sail structure allowing partial unfurling of said sails on each truncated ring.

12. The device of claim 11, wherein said guide rails are cut at the location of each said coupling system enabling said truncated rings to be folded without removing said guide rails.

13. The device of claim 3, further including a retractable sail structure on each of said truncated rings, comprising:

two arcuate guide rails provided on said arcuate portion and associated with said hollow sections, said guide rails extending approximately from said radial bars around said arcuate portion and spaced apart at said central reinforcement;

each hollow section provided with two support rods pivoted about a common sheath proximate to the geometric center of the ring, said support rods extending generally radially outward and having second sheaths attached thereto adapted to run along said guide rails; and a sail membrane for each hollow section fastened to said support rods and having a first position in which said sail structure is furled along said central reinforcement, and a second position in which said sail structure is unfurled and said sail membrane entirely covers each hollow section of said ring, a first one of said support rods being attached to a free edge of said membrane, said free edge lying adjacent the radial bar associated with said hollow section when said sail structure is unfurled.

14. The device of claim 13, wherein said sail structure further comprising:

a furling cable having bifurcated portions fastened to traction points along each of said first support rods, said bifurcated portions directed around a first pair of pulleys located on said arcuate portion on opposite sides of said central reinforcement, said bifurcated portions converging at a location proximate said central vertex and along said intersection line, said furling cable continuing away from said arcuate portion and terminating in a furling handle;

an unfurling cable having bifurcated portions fastened to said traction points along each of said first support rods, said bifurcated portions directed around a second pair of pulleys located on said radial bars on opposite sides of said central reinforcement, said bifurcated portions directed around a third pair of pulleys located on said arcuate portion on opposite sides of said central reinforcement, said bifurcated portions converging at a location proximate said central vertex and along said intersection line, said unfurling cable continuing away from said arcuate portion and terminating in an unfurling handle, the movement of both first support rods being slaved to movement of said furling and unfurling cables, the sail structure allowing partial unfurling of said sails on each truncated ring.

15. The device of claim 14, wherein said truncated ring comprises a central section and two end sections, and said device includes:

a system of hinges for collapsing said truncated ring at the intersection between said central section and said two end sections, said system of hinges comprising two pairs of hinges, each of said hinges parallel to said central reinforcement, said pairs of hinges being located on opposite sides of said reinforcement, and wherein one hinge of each of said pairs of hinges lies on said arcuate portion and the other hinge lies on one of said radial bars, and wherein said first, second and third pairs of pulleys are located on said central section of said truncated ring so that said ring can be collapsed without disassembling said sail structure.

16. The device of claim 2, wherein said truncated ring comprises a central section and two end sections, and said device includes:

a system of hinges for collapsing said truncated ring at the intersection between said central section and said two end sections, said system of hinges comprising two pairs of hinges, each of said hinges parallel to said central reinforcement, said pairs of hinges being located on opposite sides of said reinforcement, and wherein one hinge of each of said pairs of hinges lies on said arcuate portion and the other hinge lies on one of said radial bars.

17. The device of claim 16, wherein one of said pairs of hinges is located toward a front face of said ring, and the other of said pairs of hinges is located toward a back face of said ring, so that said central section of said ring is located between the two end sections when said ring is collapsed.

18. The device of claim 17, further including a rectangular box sized to hold said device in a folded condition.

19. The device of claim 16, including a coupling system between said central section and said end sections, comprising:

a straight cut line, parallel to said dentral reinforcement, each cut line crossing over a hinge parallel to the hinge axis and formed on both said arcuate portion and said radial bars, said cut line extending from a first face of said ring approximately halfway toward a second face of said ring;

a second cut parallel to said first and second faces of said ring extending from said first straight cut line away from said central reinforcement; and an S-shaped joint line perpendicular to said second cut and terminating at said second face, said coupling system enabling said ring to be collapsed to reduce its volume and facilitate transportation.

20. The device of claim 19, including a safety system comprising:

a plurality of small holes extending through said first and second faces of both said central section and said end sections, one of said holes located between each hinge and associated S-shaped joint line; and an injected allen bolt within a cylindrical rubber support installed within each of said small holes, said cylindrical rubber support expanding when said allen bolt is tightened, thus fixing and securing the coupling system between the central section and the end sections when the device is assembled.

21. The device of claim 19, including:

a central projection on the circumference of said arcuate portion; and a convex rubber protective strip adhered over said central projection, said projection and said strip being discontinuous at the location of said S-shaped joint line making it possible to collapse and couple said central section and said end sections of the ring, said rubber protective strip providing greater adherence to smooth surfaces on which said device travels, and reducing vibrations from said travel.

22. The device of claim 2, including:

a central space formed between said truncated rings;

a fastening bar connected on either end to said rings and extending across said central space, said fastening bar being positioned along said intersection line and having springs on either end;

a tubular handle journaled over said fastening bar; and a driver's harness fastened to said handlebar.

23. The device of claim 2, wherein said reinforced truncated rings comprise hollow extension tubes filled with expanded polyurethane to reduce the weight and facilitate movement of the device.

* * * * *